United States Patent
Kogan et al.

(10) Patent No.: US 12,523,621 B2
(45) Date of Patent: Jan. 13, 2026

(54) PARALLEL PLATE X-RAY COLLIMATOR HAVING A VARIABLE ACCEPTANCE ANGLE AND AN X-RAY ANALYSIS APPARATUS

(71) Applicant: Malvern Panalytical B.V., Almelo (NL)

(72) Inventors: Vladimir Kogan, Almelo (NL); Detlef Beckers, Almelo (NL); Alexander Kharchenko, Almelo (NL)

(73) Assignee: Malvern Panalytical B.V., Almelo (NL)

( * ) Notice: Subject to any disclaimer, the term of this patent is extended or adjusted under 35 U.S.C. 154(b) by 274 days.

(21) Appl. No.: 18/122,191

(22) Filed: Mar. 16, 2023

(65) Prior Publication Data
US 2023/0296536 A1    Sep. 21, 2023

(30) Foreign Application Priority Data
Mar. 17, 2022    (EP) .................................... 22162751

(51) Int. Cl.
*G01N 23/20008*    (2018.01)
*G01N 23/223*    (2006.01)

(52) U.S. Cl.
CPC ..... *G01N 23/20008* (2013.01); *G01N 23/223* (2013.01); *G01N 2223/316* (2013.01); *G01N 2223/33* (2013.01)

(58) Field of Classification Search
CPC ......... G01N 2223/316; G01N 2223/33; G01N 23/20008; G01N 23/223; G21K 1/025
See application file for complete search history.

(56) References Cited

U.S. PATENT DOCUMENTS

| | | |
|---|---|---|
| 6,444,993 B1 | 9/2002 | Kogan |
| 2009/0003530 A1 | 1/2009 | Van Vroonhoven |
| 2012/0300907 A1* | 11/2012 | Wirth ..................... G21K 1/025 |
| | | 378/154 |
| 2014/0341355 A1 | 11/2014 | Hsieh et al. |

(Continued)

FOREIGN PATENT DOCUMENTS

| | | |
|---|---|---|
| JP | H10-227898 A | 8/1998 |
| WO | WO-2017102831 A1 * | 6/2017 |

OTHER PUBLICATIONS

"European Search Report and Written Opinion," European Application No. 22162751.6-1212, Date of Mailing: Sep. 15, 2022, pp. 1-12.

(Continued)

*Primary Examiner* — David J Makiya
*Assistant Examiner* — Miya Downing
(74) *Attorney, Agent, or Firm* — Cesari and McKenna, LLP

(57) ABSTRACT

Embodiments of the present invention provide an X-ray collimator for collimating an incident X-ray beam by limiting divergence of the incident X-ray beam, the X-ray collimator having a variable acceptance angle, an X-ray analysis apparatus comprising an X-ray collimator having a variable acceptance angle and a method of using the X-ray analysis apparatus. The X-ray analysis apparatus comprises a position-sensitive X-ray detector, and the X-ray collimator is arranged between the sample and the position-sensitive X-ray detector to limit axial divergence of X-rays from the sample.

14 Claims, 6 Drawing Sheets

(56) References Cited

U.S. PATENT DOCUMENTS

2019/0187076 A1 6/2019 Filsinger et al.
2019/0317029 A1* 10/2019 Beckers ........... G01N 23/20008

OTHER PUBLICATIONS

Pecharsky, Vitaly K., et al., "Fundamentals of Powder Diffraction and Structural Characterization of Materials", Jan. 1, 2005, pp. 115-118.

* cited by examiner

PARALLEL PLATE X-RAY COLLIMATOR HAVING A VARIABLE ACCEPTANCE ANGLE AND AN X-RAY ANALYSIS APPARATUS

CROSS-REFERENCE TO RELATED APPLICATIONS

The present application claims the benefit of and priority to European Patent Application No. 22162751.6, filed Mar. 17, 2022, the entire content of which is owned by the assignee of the instant application and is incorporated herein by reference in its entirety.

FIELD OF THE INVENTION

The present invention relates to a parallel plate X-ray collimator having a variable acceptance angle, and an X-ray analysis apparatus comprising a position-sensitive X-ray detector and a parallel plate X-ray collimator having a variable acceptance angle.

BACKGROUND OF THE INVENTION

In the field of material analysis, X-rays are used to characterise samples. X-ray diffraction (XRD) is used in various analytical techniques to gain insight into the chemical composition of a sample.

Samples comprising crystalline components can be analysed by irradiating the sample with X-rays, and detecting X-rays diffracted by the sample. A diffractometer can be used obtain a diffraction scan of a sample, by measuring the intensity of diffracted X-rays as a function of the diffraction angle $2\theta$. The diffraction scan can be analysed to identify and quantify phases (crystalline components) present in the sample based on the $2\theta$ positions of the diffraction peaks in the scan.

Some diffractometers use the parafocussing Bragg Brentano geometry, in which the sample is irradiated with a divergent incident X-ray beam and diffracted as a convergent X-ray beam. In this geometry, the X-ray detector (and optionally the X-ray source) are mounted to a goniometer. The angle between the incident beam and the sample is changed while the X-ray detector is rotated about the goniometer axis to corresponding $2\theta$ positions. Other X-ray diffraction analysis geometries can also be used to analyse samples, for example X-ray powder diffraction in transmission geometry, Debye Scherrer analysis, Grazing Incidence X-ray Diffraction (GIXRD) analysis.

X-ray diffraction is also used in wavelength dispersive X-ray fluorescence (WDXRF) analysis. In WDXRF analysis, a sample is irradiated to cause it to fluoresce. Characteristic radiation emitted from a sample is diffracted into different directions by an analysing crystal or monochromator. By moving the X-ray detector through an angular range, the intensity of X-rays at a particular wavelength can be measured.

X-ray Reflectometry (XRR) is another analysis technique. It is used to measure thin films on a substrate. XRR involves irradiating the sample with a highly collimated (i.e. parallel) X-ray beam and measuring X-rays reflected at interfaces with different refractive indices over a range of angles.

Interpreting the results of X-ray diffraction analysis can complicated by geometrical aberrations that deform and/or shift peaks from their original ("ideal" $2\theta$ Bragg) positions. For example, axial divergence (i.e. divergence of the incident and/or diffracted X-ray beam along the goniometer axis) of X-rays can cause diffraction peaks to exhibit peak asymmetry, especially at low $2\theta$ angles. In particular, axial divergence can cause the measured diffraction peaks to have a low-$2\theta$ peak tail and a shift along the $2\theta$ axis (e.g. a shift in peak "center of gravity") from the "ideal" $2\theta$ Bragg-position. When reflections from the sample exhibit peak broadening (e.g. originating from small crystallites in the sample), convolution with the highly asymmetrical aberration caused by axial divergence can result in quasi-symmetric peaks shifted from their ideal $2\theta$ Bragg positions. The effect of aberrations can make it particularly challenging to carry out analytical tasks such as elemental analysis, phase identification, indexing the crystallographic unit cell or discriminating between polymorphs.

Likewise, the interpretation of other types of X-ray analysis involving measuring X-rays from the sample over a range of angles, for example XRR analysis and Pair Distribution Function analysis, can be complicated by axial divergence of the X-ray trajectories.

X-ray collimators, such as Soller slit collimators, can be used to reduce axial divergence. Soller slit collimators are parallel plate collimators used to limit axial divergence. The X-ray collimator is designed to limit divergence to an amount with the acceptance angle of the X-ray collimator. However, this comes at the cost of reduced intensity and/or increased measurement times. Additionally, samples may exhibit low intensity diffraction peaks at high angles for which it would be undesirable to sacrifice intensity in order to suppress geometrical aberrations. Interrupting a diffraction scan to replace the Soller slit collimator is inconvenient and time consuming.

It would be desirable to be able to carry out convenient X-ray analysis, to obtain a measurement scan with minimal geometrical aberrations, whilst maintaining satisfactory peak intensity across a range of angles, and without requiring high measurement times.

It would also be desirable to provide compact X-ray analysis equipment. For X-ray analysis methods involving obtaining a $2\theta$ scan, there is typically limited space on the diffracted beam side of X-ray analysis equipment (between the sample and the X-ray detector) in which to arrange additional components. In particular, it is important that the components on the diffracted beam side do not interfere with movement of the X-ray detector along its scanning path.

SUMMARY OF THE INVENTION

The invention is defined by the claims.

According to examples in accordance with a first aspect of the invention, there is provided an X-ray collimator for collimating an X-ray beam in a collimation direction by limiting divergence of an incident X-ray beam, the X-ray collimator comprising a plurality of plates spaced apart from one another and arranged in a stack, along a stacking axis, to define a plurality of elongate collimator channels, wherein each elongate collimator channel is defined by a pair of adjacent plates spaced apart from one another by a separation distance;

wherein the X-ray collimator is configured to limit divergence along the stacking axis; and wherein each plate of the plurality of plates has a length, and the length of the plates varies along the stacking axis.

The length of the plates (i.e. plate length) varies along the stack. That is, at least some of the plates have different lengths to one another. In some embodiments, at least some of the plates have the same length as each other. In some other embodiments, every plate in the stack has a different length. Plate length may vary linearly or-non linearly as a function of location along the stacking axis.

The length of the plates may decrease along the stacking axis.

The length of the plates may decrease along the stacking axis for at least a portion of the stack. That is, in the portion of the stack for which the length of the plates decreases, the length of each plate may be equal to or less than the length of the previous plate ($l_n \geq l_{n+1}$, where each value of n is associated with a plate in the stack and increases in the direction of decreasing length).

In some embodiments, the length of the plates may strictly decrease along the stacking axis ($l_n > l_{n+1}$, where each value of n is associated with a plate in the stack and increases in the direction of decreasing length) for at least a portion of the stack.

In some embodiments, the length of the plates may decrease (or may strictly decrease) from a first end of the stack to a second end of the stack opposite to the first end. That is, the length of the plates may decrease (or may strictly decrease) continuously across the entire stack.

The separation distance between pairs of adjacent plates may vary along the stack and the length of the plates may vary along the stacking axis such that the acceptance angle of the X-ray collimator decreases along the stacking axis.

Accordingly, the separation distance between adjacent pairs of plates may not be constant. The separation distance between the plates may increase along the stack from a first pair of plates at the first end of the X-ray collimator, to the final pair of plates at the second end of the stack. The separation distance may increase along the stack ($d_n \leq d_{n+1}$) or it may strictly increase along the stack ($d_n < d_{n+1}$).

The X-ray collimator may comprise a first portion and a second portion, and each of the first portion and the second portion may comprise a plurality of collimator channels, wherein in the first portion the acceptance angle may decrease along the stacking axis and in the second portion the acceptance angle may be constant.

The acceptance angle may decrease linearly in the first portion, or it may decrease non-linearly (for example, the acceptance angle may decrease according to a function approximating the decreasing portion of a sine curve).

According to examples in accordance with a second aspect of the invention, there is provided an X-ray analysis apparatus comprising:

a sample stage for supporting a sample;
an X-ray source arranged to irradiate the sample with an incident X-ray beam at an incident angle θ;
a position-sensitive X-ray detector arranged to move along a scanning path, by rotating about a rotation axis, to receive X-rays from the sample at an angle 2θ, the position-sensitive X-ray detector comprising a plurality of detection channels for receiving X-rays; and
an X-ray collimator arranged to limit axial divergence of X-rays, the X-ray collimator comprising a plurality of plates in a stack and spaced apart from one another along a stacking axis, wherein the acceptance angle of the X-ray collimator varies along the stacking axis and the X-ray collimator is configured to translate axially.

The X-ray collimator is arranged to limit divergence of X-ray in directions parallel to the rotation axis (i.e. it is arranged to limit "axial divergence"). Accordingly, the X-ray collimator is arranged with its stacking axis parallel to the rotation axis.

The X-ray collimator is configured to translate along an axis parallel to the rotation axis.

The position-sensitive X-ray detector is position sensitive in the sense that it comprises multiple independent detection elements (detector channels) which are each capable of measuring X-ray intensity independently of one another.

The X-ray apparatus may further comprise a processor configured to receive measured X-ray intensities from each of the detection channels. The processor may associate measured X-ray measurement data with a position of the detection channel that obtained the X-ray measurement data.

The X-rays may be diffracted by the sample and/or reflected by the sample.

The X-ray analysis apparatus may comprise an actuator configured to cause the X-ray collimator to translate axially.

Each of the detection channels may comprise a detection strip, and the width of the stack of plates may be greater than each of the lengths of the detection strips.

The width of the stacked plates is the dimension of the stacked plates along the stacking axis. The detection strip is a strip-shaped detection element.

The separation between adjacent plates and/or the length of the plates may vary along the stacking axis such that the acceptance angle of the X-ray collimator decreases along the stacking axis.

The X-ray collimator may be an X-ray collimator according to any of the above-describes examples according to the first aspect of the invention.

The X-ray collimator may be arranged between the sample and the position-sensitive X-ray detector.

The X-ray analysis apparatus may further comprise a controller configured to move the X-ray collimator. The controller may be configured to change the axial position of the X-ray collimator based on the angular position of the position-sensitive X-ray detector.

The controller may be configured to move the X-ray collimator axially such that the acceptance angle of the portion of the X-ray collimator seen by the position-sensitive X-ray detector increases with the angular position of the X-ray detector. The angular position of the position-sensitive X-ray detector and axial position of the X-ray collimator may be synchronized to vary the acceptance angle of the X-ray collimator with 2θ angle.

The X-ray analysis apparatus may be configured to:
irradiate the sample at a fixed incident angle, θ, while the angular position of the position-sensitive X-ray detector is changed; or
irradiate the sample at a variable incident angle, θ, and to control the angular position of the position-sensitive X-ray detector, 2θ, to vary symmetrically according to the incident angle; or
irradiate the sample at a variable incident angle, θ, and to control the angular position of the position-sensitive X-ray detector, 2θ, at an offset according to the incident angle The controller may be configured to control the angular position of the position-sensitive X-ray detector. Additionally, the controller may be configured to control the position of the X-ray source relative to the sample (by changing the position of the X-ray source and/or the position of the sample), thereby controlling the incident angle.

The X-ray analysis apparatus may be configured to:
carry out X-ray diffraction analysis in parafocussing Bragg Brentano reflection geometry, carry out X-ray diffraction analysis in focusing transmission geometry, carry out X-ray diffraction analysis in Debye geometry, carry out X-ray diffraction analysis in Grazing Incidence geometry, carry out Stress analysis, carry out Texture analysis or to carry out X-ray Reflectometry measurements; or carry out wavelength-dispersive X-ray fluorescence analysis.

The controller may be configured to control the X-ray apparatus to arrange the X-ray source, sample and position X-ray detector in the appropriate geometry.

According to examples in accordance with a third aspect of the invention, there is provided a method of using the above-described X-ray analysis apparatus, the method comprising:

irradiating the sample with X-rays;
detecting X-rays from the sample while the X-ray collimator is at a first axial position; and
changing the axial position of the X-ray collimator from the first axial position to a second axial position to change the acceptance angle of the X-ray collimator.

The axial position of the X-ray collimator may be adjusted based on the angular position of the position-sensitive X-ray detector and/or the sample under analysis. The axial position of the X-ray collimator may be changed while the position-sensitive X-ray detector is moving. Alternatively, the axial position of the X-ray collimator may be adjusted while the position-sensitive X-ray detector remains stationary.

The method may comprise, after detecting X-rays from the (first) sample with the X-ray collimator in the first axial position, replacing the (first) sample with a different (second) sample and detecting X-rays from that sample with the X-ray collimator in the second axial position.

Changing the axial position of the X-ray collimator may comprise increasing the acceptance angle of the X-ray collimator, and the method may further comprise:

detecting X-rays from the sample at a measurement angle $2\theta_1$ while the position-sensitive X-ray detector is in its first axial position;
changing the angular position of the position-sensitive X-ray detector to an angle $2\theta_2$, wherein $2\theta_2 > 2\theta_1$.

The axial position of the X-ray collimator is the position of the X-ray collimator along the rotation axis of the X-ray analysis apparatus. By changing the position of the X-ray collimator, the acceptance angle of the portion of the X-ray collimator seen by the position-sensitive X-ray detector can be adjusted. In this way, it is possible to change the acceptance angle of the X-ray collimator.

The method may comprise detecting X-rays diffracted by the sample at a diffracted angle $2\theta_1$.

According to examples in accordance with a fourth aspect of the invention, there is provided a computer program product comprising instructions to cause the above-described apparatus to carry out the above-described method.

The computer program may cause the controller to adjust the $2\theta$ position of the position-sensitive X-ray detector and the axial position of the X-ray collimator based on the actual or expected position of the position-sensitive X-ray detector.

In some embodiments, the $2\theta$ scan obtained using the X-ray collimator may be processed to account for the variable flux associated with varied acceptance angles. The X-ray analysis apparatus may therefore comprise a processor configured to process the X-ray analysis data obtained by the X-ray analysis apparatus to adjust for variable flux based on the acceptance angle of the X-ray collimator.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

Figure 1:
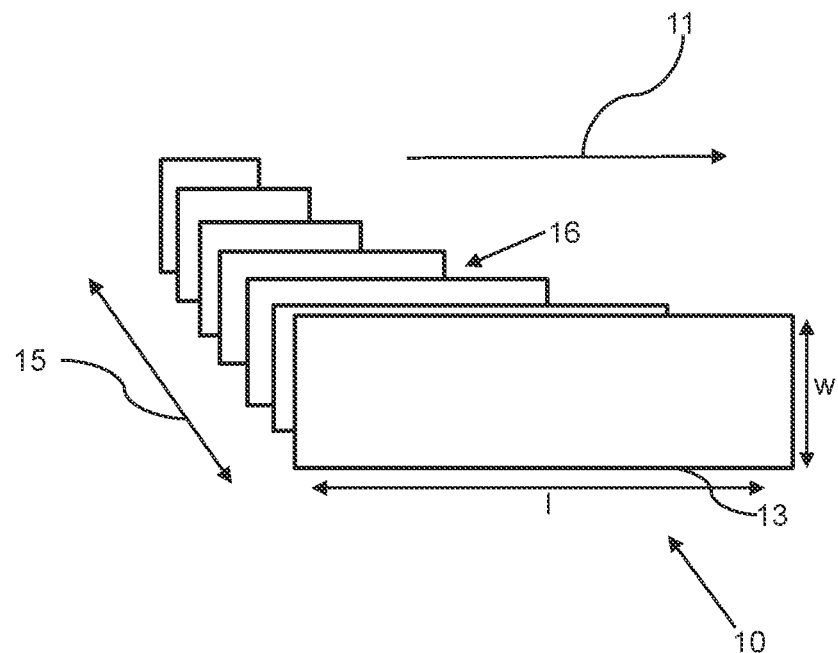
FIG. 1 is a schematic diagram, in a perspective view, of an X-ray collimator according to an embodiment of the invention.

FIG. 1 is a schematic diagram of an X-ray collimator 10 for collimating an X-ray beam in a collimation direction 11 by limiting divergence of the X-ray beam along an axis 15 perpendicular to the collimation direction 11. The X-ray collimator 10 comprises a stack of rectangular plates 13 spaced apart from one another along a stacking axis 15 to define a plurality of elongate collimator channels 16 defined between adjacent pairs of plates. As shown in FIG. 1, the plurality of plates are substantially mutually parallel to one another. The length of the plates (the dimension of the plates along the collimation direction 11) varies along the stacking axis. That is, as illustrated in FIG. 1, rather than each plate in the stack having the same length, the lengths of at least some of the plates in the stack are different from one another. In particular, the lengths of the plates decreases ($l_n \le l_{n+1}$) in one direction along the stacking axis 15.

Each elongate collimator channel 16 is defined by a pair of adjacent (i.e. consecutive) plates spaced apart from one another by a separation distance, d. The collimator channels 16 limit divergence of an incident X-ray beam along the stacking axis, thereby collimating the incident X-ray beam in the collimation direction 11.

In general, the acceptance angle, $2\alpha$, of each collimator channel 16 is determined by the separation distance between the plates defining the channel, d, and the length of the plates, l, forming the channel.

$$2\alpha = 2\tan^{-1}\left(\frac{d}{l}\right) \quad \text{Equation 1}$$

X-rays that are incident along the collimation direction, or that diverge from the collimation direction but are within the acceptance angle of the channel (that is, the acceptance angle at the point of entry to the X-ray collimator), pass through the collimator. X-rays incident at an angle outside of the acceptance angle are prevented from passing through the X-ray collimator 10 by the plates 13 on either side of the channel. In embodiments of an X-ray collimator according to the invention, the respective lengths of two plates forming a channel may be different from one another. In this case, the acceptance angle of a channel can be defined as follows, wherein $l_1$ and $l_2$ are the respective lengths of the plates forming the channel:

$$2\alpha = 2\tan^{-1}\left(\frac{d}{0.5l1 + 0.5l2}\right) \quad \text{Equation 2}$$

The inventors have realized that using an X-ray collimator 10 having a varied plate length along the stacking axis can help to achieve improved X-ray analysis. In particular, the inventors have realized that this type of X-ray collimator can be used in combination with a position-sensitive X-ray detector to achieve high intensity, high resolution X-ray analysis results (particularly for parafocussing Bragg Brentano XRD and WD-XRF), in a compact arrangement, without the need for long measurement times.

In use, the X-ray collimator 10 can be positioned in the X-ray beam from the sample with the parallel plates stacked along the rotation axis of the X-ray detector, to limit axial divergence of the diffracted X-ray beam. The acceptance angle of the X-ray collimator can be adjusted by moving the X-ray collimator laterally, in a direction parallel to the rotation axis. For example, the axial position of the X-ray collimator can be adjusted according to the 2θ position of the X-ray detector, to achieve an optimal balance between the measured X-ray intensity and resolution. Changing the acceptance angle of the X-ray collimator during the angular scan of the X-ray detector by translating the X-ray collimator laterally facilitates convenient adjustment of the acceptance angle whilst minimizing the amount by which the X-ray collimator projects in the equatorial plane.

Further, the inventors have realized that the X-ray collimator can be used with a position-sensitive X-ray detector to achieve high-quality measurements without compromising measurement time or imposing significant space constraints. The combination of the X-ray collimator with a position-sensitive X-ray detector can deliver high intensity measurements in a time-efficient X-ray manner. In contrast to a parallel plate X-ray collimator that must be rotated to change the length of the plate along the X-ray beam path (and thereby change the acceptance angle of the collimator), an X-ray collimator arranged to move laterally to vary the acceptance angle does not require a large amount of space in the equatorial plane. Additionally, the inventors have realised that adjusting the acceptance angle by changing the lateral position of an X-ray collimator can help to ensure X-rays along different trajectories are limited by the same aperture angle, so that different channels of the position-sensitive X-ray detector register X-rays limited by the same acceptance angle.

Figure 2:
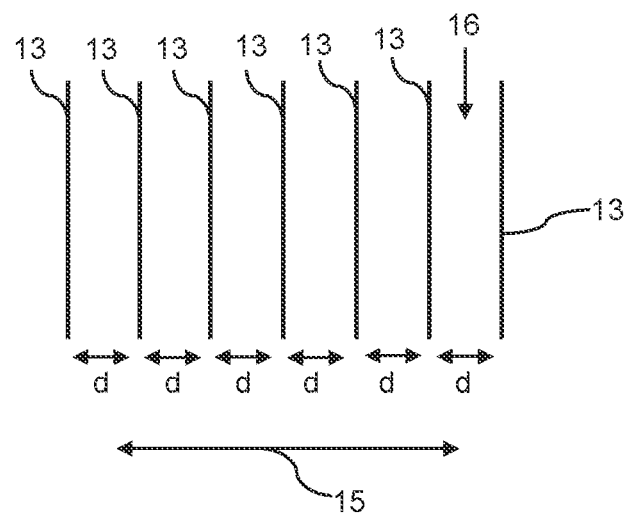
FIG. 2 is a schematic diagram, showing an end view of the X-ray collimator of FIG. 1.

FIG. 2 shows an end view of the X-ray collimator of FIG. 1, as viewed from the incident side of the collimator (the left hand side of the page). Accordingly, in FIG. 2 the collimation direction 11 extends into the plane of the page. As shown in FIG. 2, each collimator channel 16 is defined by a pair of adjacent plates 13 spaced apart from one another by a separation distance, d. In FIG. 2, the separation distance is the same for each collimator channel 16. However, in some embodiments of the X-ray collimator 10 the separation distance may vary along the stacking axis 15.

Figure 3:
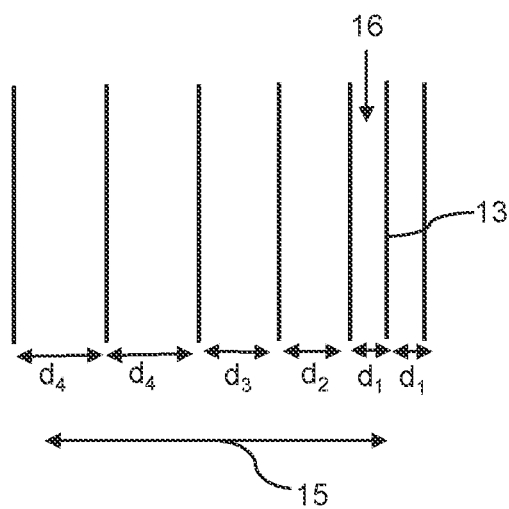
FIG. 3 is a schematic diagram showing an end view of another embodiment of an X-ray collimator.

FIG. 3 shows an end view of another embodiment of an X-ray collimator 10. The X-ray collimator 10 of FIG. 3 has the same structure as the X-ray collimator of FIG. 1, except for that in the X-ray collimator 10 of FIG. 3 the separation distance, d, between the plates 13 varies along the stacking axis 15. In some embodiments, the separation distance, d, may decrease (or strictly decrease) along the stacking axis in a first direction, while the length of the plates increases (or strictly increases) along the stacking axis in the first direction.

While the length of the plates of the X-ray collimator 10 of FIG. 1 is shown as strictly decreasing from one plate to the next ($l_n > l_{n+1}$), the length of plates may decrease along the stacking axis such that the length of a plate is equal to or less than the length of the previous adjacent plate ($l_n \geq l_{n+1}$). The X-ray collimator may comprise one or multiple portions in which the length of the plates is constant in addition to one or multiple portions in which the length of the plates strictly decreases.

Figure 4:
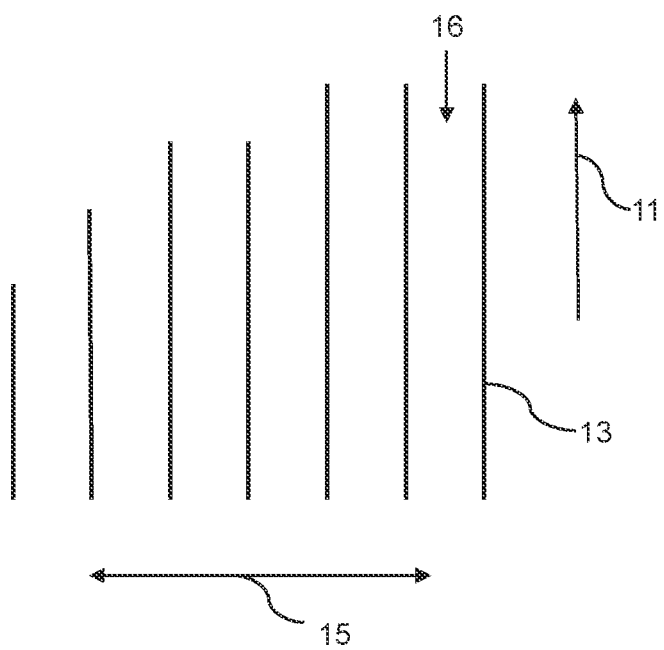
FIG. 4 is a schematic diagram showing an end view of another embodiment of an X-ray collimator.

FIG. 4 is a schematic diagram illustrating a plan view of another embodiment of the X-ray collimator. The X-ray collimator 10 of FIG. 4 has the same structure as the X-ray collimator of FIG. 1, except for as shown in FIG. 4, the length of the plates decreases non-linearly. The plate length can vary according to other non-linear functions. For example, the plate length may vary according to a sinusoidal function.

It will be appreciated that in embodiments in which both the plate length and the separation distance vary along the stacking axis, there are multiple different ways in which each of the length and separation distance vary along the stacking axis. All that is required is that the acceptance angle of the channels decreases in one direction along the stacking axis, for at least a portion of the X-ray collimator.

Figure 5A:
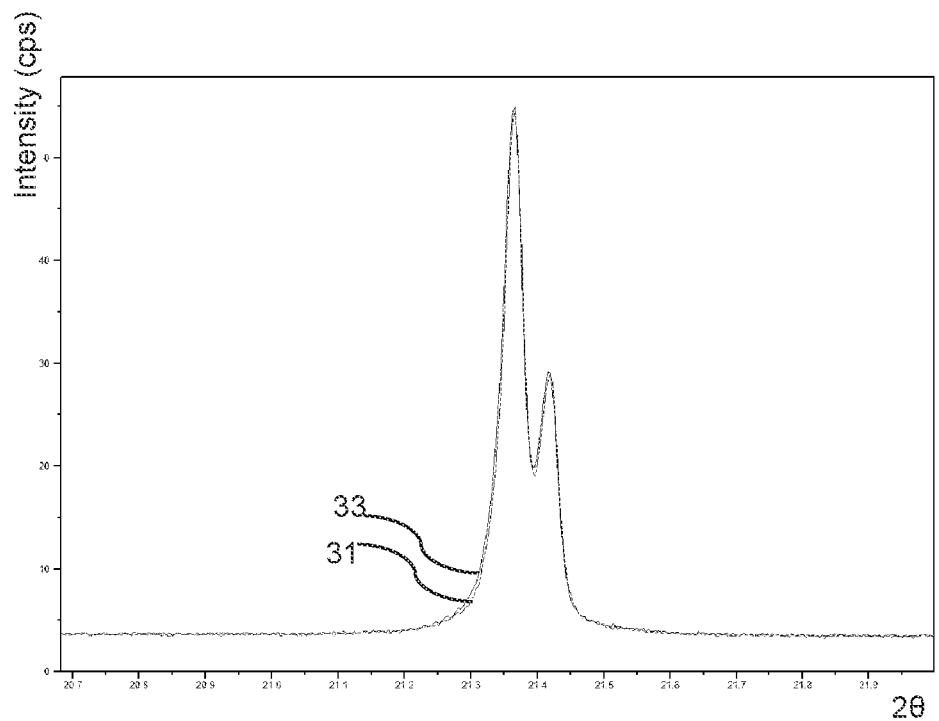
FIG. 5A shows two low angle diffraction scans; one obtained using an X-ray collimator having an adjustable acceptance angle and one obtained using an X-ray collimator having a constant acceptance angle, the X-ray collimators operated at the same acceptance angle.
Figure 5B:
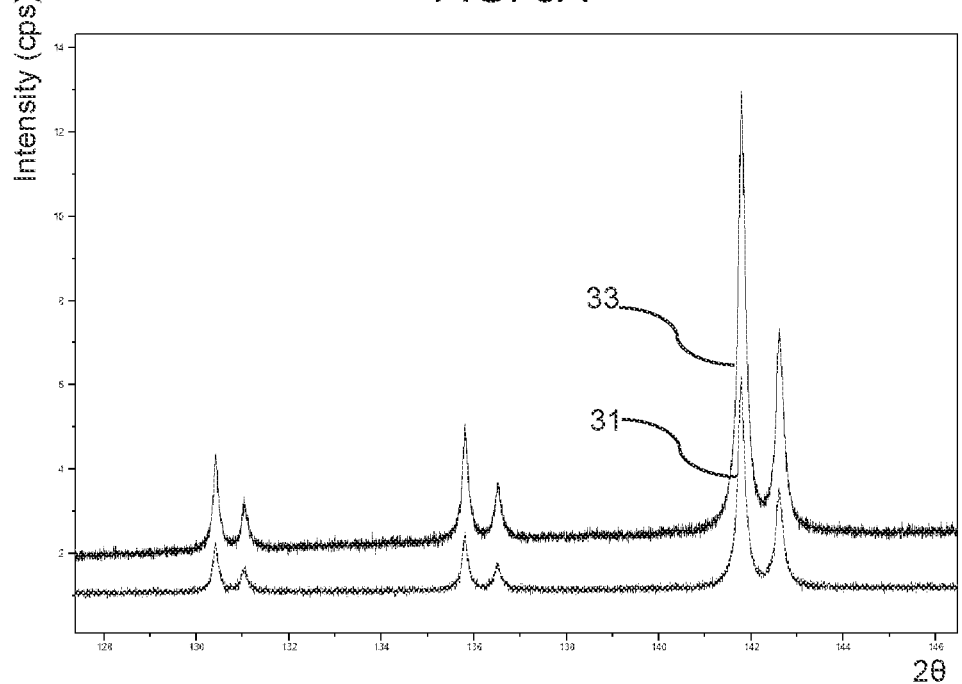
FIG. 5B shows two high angle diffraction scans; one obtained using an X-ray collimator having an adjustable acceptance angle and one obtained using an X-ray collimator with a constant acceptance angle.

FIG. 5 illustrates the benefit of varying the acceptance angle of the X-ray collimator with diffraction angle. FIGS. 5A and 5B show parts of a diffraction scan. FIG. 5A shows a low-angle portion of the diffraction scan, while FIG. 5B shows a high-angle portion of the diffraction scan.

FIG. 5A is a low-angle portion of a diffraction scan 31 obtained using a Soller slit collimator (with a fixed acceptance angle). The acceptance angle of the Soller slit collimator has been selected to achieve good resolution at low angles (at the cost of intensity), as well as a low-angle portion of a diffraction scan 33 obtained using a parallel plate X-ray collimator having an adjustable acceptance angle, wherein the acceptance angle is the same as the acceptance angle of the Soller slit collimator. In both cases, there is very little peak asymmetry.

FIG. 5B shows a high-angle portion of the diffraction scan 31 using the Soller slit collimator (having the same acceptance angle as that used in the low angle scan) and a high-angle portion of the diffraction scan 33 using the adjustable acceptance angle X-ray collimator. The acceptance angle of the adjustable acceptance angle X-ray collimator has been increased with diffraction angle. As shown in FIG. 5B, at high angles, the fixed X-ray collimator scan has a relatively low intensity compared to the adjustable X-ray collimator scan, but the level of peak asymmetry is substantially the same for both scans. This demonstrates that the acceptance angle of the X-ray collimator does not strongly influence resolution at high angles.

Figure 6:
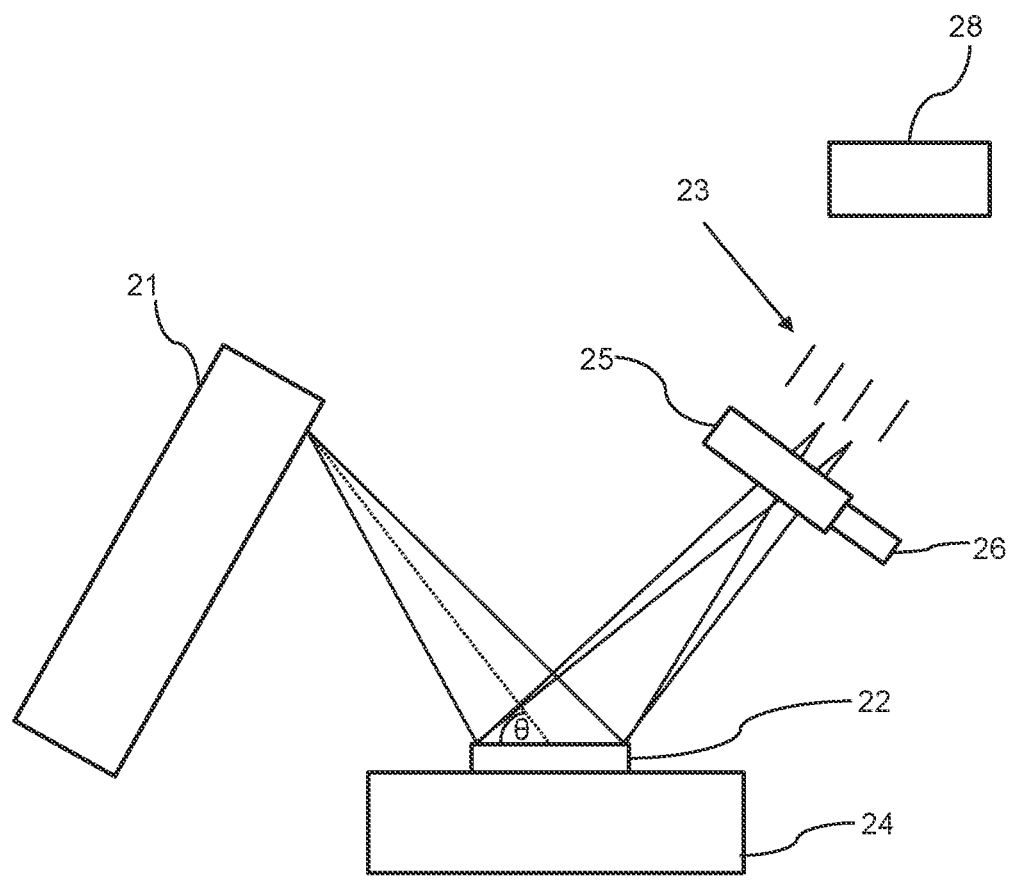
FIG. 6 is a schematic diagram of an X-ray diffraction analysis apparatus according to an embodiment of the invention.

FIG. 6 is a schematic diagram of an X-ray diffraction analysis apparatus according to an embodiment of the invention. The X-ray diffraction apparatus 20 is arranged to carry out X-ray diffraction analysis in Bragg Brentano parafocussing geometry. An X-ray source 21 irradiates a sample 22, supported by a sample stage 24, with a divergent incident X-ray beam. The X-ray source is configured to generate the incident X-ray beam as a "line source". That is, the X-rays appear to originate from a line on the anode (in FIG. 6, the line extends into the plane of the page). X-rays diffracted by the sample 22 are received at an X-ray detector 23.

In use, the angle between the incident X-ray beam and the sample is adjusted, using a goniometer (not shown), over a range of incident angles. To obtain the 2θ diffraction scan, the X-ray detector 23 is rotated about the goniometer axis, which extends into the plane of the page, to various 2θ positions.

The position-sensitive X-ray detector 23 is a one-dimensional (1-D) X-ray detector; it comprises a plurality of strip-shaped detection elements, which extend across the X-ray detector so that the detection elements are stacked in an equatorial direction. The X-ray detector is "position sensitive" in the sense that it is possible to distinguish between the intensities measured by different detection elements. This allows the diffraction scan to be carried out relatively quickly (for example, in comparison to a 0-D X-ray detector).

An X-ray collimator 25 is arranged between the sample 22 and the position-sensitive X-ray detector 23. The X-ray collimator comprises a plurality of stacked, mutually parallel plates arranged to limit divergence of diffracted X-rays in the axial direction (along the goniometer axis about which the position-sensitive X-ray detector 23 is rotated to change the angle 2θ). The X-ray collimator 25 is coupled to an actuator 26 configured to adjust the position of the X-ray collimator 25 along the goniometer axis (i.e. in FIG. 6, in a direction perpendicular to the plane of the page).

The X-ray collimator 25 and the position-sensitive X-ray detector 23 are arranged such that the angular width of the active area of the position-sensitive X-ray detector 23 is equal to or less than the angular width of the stack of parallel plates, as seen from the sample. The angular width of the active area and the angular width of the stack of parallel plates is determined along the 2θ direction. Additionally, the angular length of the stack of the plates (the dimension of the stack in the axial direction) is greater than the angular length of the detection elements, as seen from the sample.

The X-ray collimator 25 is positioned in the diffracted X-ray beam, to collimate the diffracted X-rays before the diffracted X-ray beam reaches the position-sensitive X-ray detector 23.

The X-ray diffraction apparatus further comprises a controller 28. The controller 28 is configured to control the actuator 26 to adjust the axial position of the X-ray collimator 25. The controller may be configured to change the position of the X-ray collimator 25 in response to a user command. Alternatively, the controller 28 may be configured to adjust the axial position of the X-ray collimator automatically. For example, the controller 28 may be configured to adjust the axial position of the X-ray collimator based on the position of the X-ray source 21, the sample 22, or the position-sensitive X-ray detector 23. In this way, the acceptance angle of the X-ray collimator 25 can be synchronized with 2θ angle, facilitating an improved balance between X-ray intensity and resolution across the 2θ scan.

The axial position of the X-ray collimator 25 may be adjusted to ensure that the acceptance angle of the portion of the X-ray collimator seen by the sample increases with increasing 2θ angle. For example, a (or a plurality of) relatively low acceptance angle(s) may be used for 2θ angles between 0 and 50 degrees. Above 50 degrees, a relatively high acceptance angle may be used.

As previously mentioned, the X-ray collimator 25 can be arranged in the diffracted beam path to limit axial divergence of the diffracted X-ray beam. The X-ray collimator 25 may be combined with a primary X-ray collimator arranged in the incident X-ray beam path to limit axial divergence of the incident X-ray beam. In some embodiments, the primary X-ray collimator may comprise a variable aperture X-ray collimator (in which length and/or separation distance varies along the stacking axis) in the incident X-ray beam path in addition to the variable aperture X-ray collimator 25 in the diffracted X-ray beam path. In some other embodiments, the X-ray collimator 25 may be combined with a variable aperture X-ray collimator that is rotated to adjust the lengths of the plates along the incident X-ray beam. In some other embodiments, the X-ray apparatus may include a Soller slit collimator (having a fixed acceptance angle) as the primary X-ray collimator.

Figure 7:
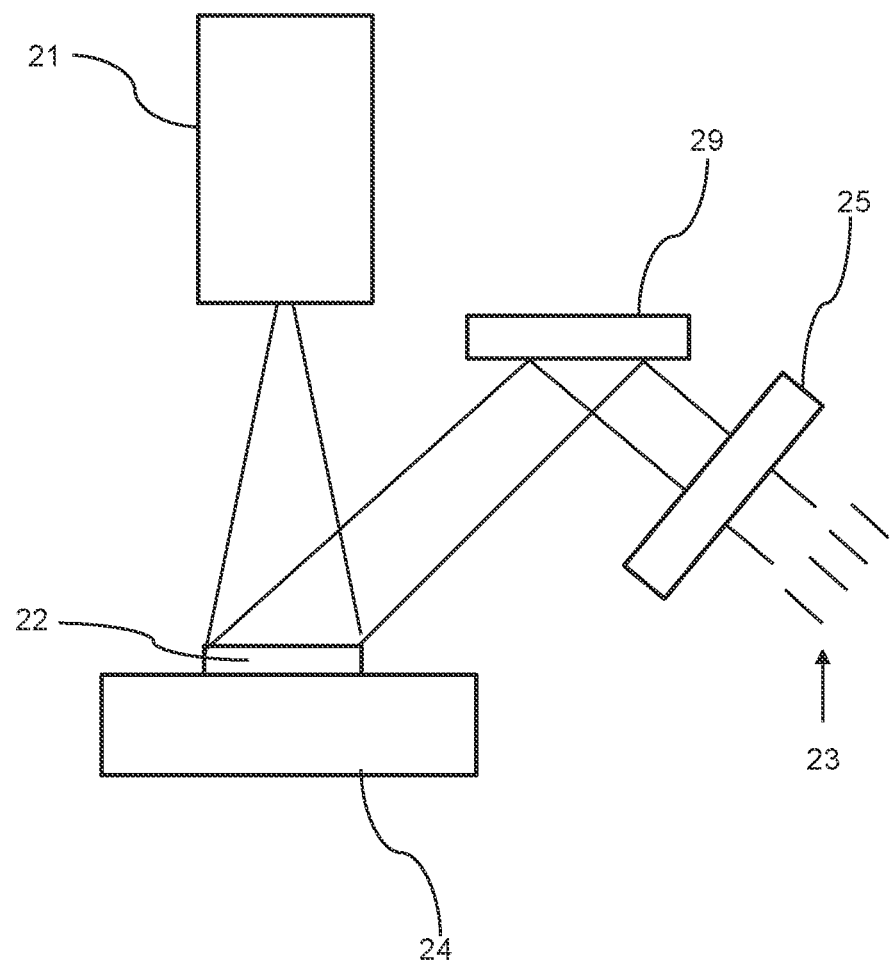
FIG. 7 is a schematic diagram of an X-ray analysis apparatus arranged to carry out wavelength dispersive X-ray fluorescence analysis, according to an embodiment of the invention.

FIG. 7 illustrates an X-ray analysis apparatus for carrying out WDXRF analysis of a sample 22. The X-ray analysis apparatus comprises an X-ray source 21, a sample stage 24 for supporting the sample, an X-ray collimator 25 and a 1-D X-ray detector 23. An analyzing crystal 29 is arranged between the sample 22 and the 1-D X-ray detector.

The lateral position of the X-ray collimator 25 can be adjusted based on the angular position of the 1-D X-ray detector, to vary the acceptance angle of the X-ray collimator with the angular position of the position-sensitive 1D X-ray detector.

Figure 8:
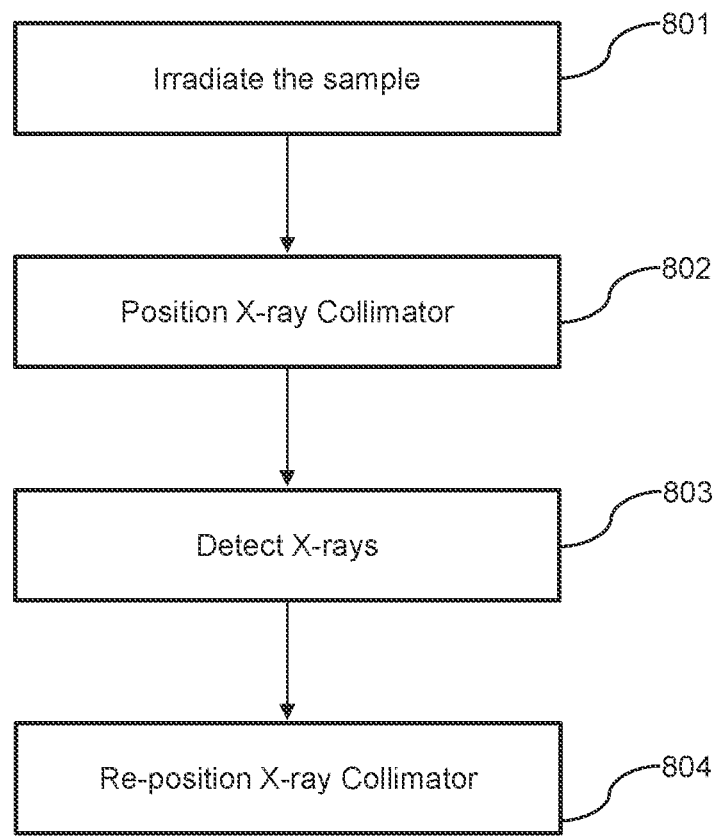
FIG. 8 is a diagram illustrating a method according to an embodiment of the invention.

FIG. 8 illustrates a method according to an embodiment of the invention. The method comprises irradiating the sample 801 with the X-ray collimator in an initial axial position 802 and detecting X-rays 803 from the sample. The method further comprises re-positioning 804 the X-ray collimator to a subsequent axial position.

In an embodiment, the method comprises irradiating a sample with X-rays at an incident angle θ, 801, positioning the X-ray collimator in a first axial position, 802, and detecting X-rays from by the sample (e.g. X-rays diffracted by the sample) at a measurement angle $2θ_1$, 803. Further, the method comprises changing the position-sensitive X-ray detector angle to $2θ_2$, wherein $2θ_2 > 2θ_1$, and changing the axial position of the X-ray collimator, 804, to increase the acceptance angle of the portion of the X-ray collimator seen by the position-sensitive X-ray detector.

In some embodiments of the method, changing the axial position of the X-ray collimator may comprise moving the collimator in a first axial direction. The method may further comprise changing the angular position of the X-ray detector from the angle $2θ_2$ to an angle $2θ_3$, wherein $2θ_3 > 2θ_2$, and changing the axial position of the X-ray collimator, wherein the acceptance angle of the X-ray detector at $2θ_2$ is equal to the acceptance angle of the portion of the X-ray collimator seen by the X-ray detector at $2θ_3$.

The position-sensitive X-ray detector may be configured to measure the intensity associated with each detection channel and to output the measured intensity to a processor. The X-ray analysis apparatus may comprise a processor configured to associate the measured intensity of each detection channel with an angular position associated with that detection channel. The processor may be configured to combine intensity measurements obtained by different detector channels at different times in the scan. In this way, the intensity associated with an angular position of the scan can be determined by combining intensity measurements obtained by different detector channels.

In some embodiments, the axial position of the X-ray collimator is changed during a 2θ scan.

In some embodiments, the axial position of the X-ray collimator is changed in-between measurements (e.g. in between multiple 2θ scans). For example, in an embodiment, a method of X-ray analysis according to the invention comprises analyzing a first sample with the X-ray collimator in a first axial position, replacing the first sample with a second sample (comprising a different material to the first sample) and analyzing the second sample with the X-ray collimator in a different, second axial position. In this way, the first sample and the second sample can be analysed using different acceptance angles of the X-ray collimator. In particular, for each sample, the position-sensitive X-ray detector can measure a different peak. It may be appropriate to use a different acceptance angle depending on the sample to be analysed. By adjusting the position of the X-ray collimator, the acceptance angle can be conveniently varied according to the sample. This may be particularly useful when measuring metal samples, for example.

In general, the position-sensitive X-ray detector may be a 1-D X-ray detector comprising multiple strip shaped detection elements. Alternatively, the position-sensitive X-ray detector may comprise a two-dimensional array of detection elements. In such embodiments, the position-sensitive X-ray detector may be operated as a 1-D X-ray detector. For example, a strip of pixels of the 2-D array along the axial direction can be binned as a strip detection element, or the data may be collected as a 2-D scan and processed to bin the pixels in this way. The position-sensitive X-ray detector may be configured to carry out the 2θ scan continuously, or in multiple separate steps.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It will be appreciated that while the schematic diagrams in the figures depict an X-ray collimator with seven plates, the X-ray collimator can comprise any number of plates.

The length of the plate is the dimension of the plate along the collimation axis, perpendicular to the stacking axis.

Each plate may be rectangular in shape. Alternatively, one or each of the plates may not be rectangular.

The length of the plates may be varied in any way, as long as the acceptance aperture of at least a portion of the X-ray collimator decreases (or strictly decreases) in the stacking direction. For example, the length of the plates may decrease linearly or may vary non-linearly. For example, when the length of the plates varies non-linearly it may, for example, vary according to a sinusoidal function.

The plate separation may be constant or it may vary in any way (linearly or non-linearly), as long as the acceptance aperture of the X-ray collimator decreases (or strictly decreases) in the stacking direction.

The controller may be in wired or wireless communication with other components of the X-ray diffraction apparatus.

The plates of the X-ray collimator may be spaced apart by spacers. The spacers may comprise material that is substantially transparent to X-rays.

The X-ray detector may be mounted to a goniometer. In some embodiments, both the X-ray detector and the X-ray source may be mounted to a goniometer (for example, to facilitate symmetric scanning or asymmetric scanning) In some alternative embodiments, the X-ray detector may be mounted to a goniometer and the position of the sample may be changed to change the incident X-ray beam angle.

The X-ray analysis apparatus may comprise an adjustable X-ray collimator in both the incident X-ray beam path and the diffracted X-ray beam path.

It will be appreciated that while the X-ray analysis apparatus has been illustrated in geometries for carrying out Bragg Brentano or WDXRF analysis, the apparatus can be arranged differently in order to carry out other X-ray analysis techniques involving scanning the position-sensitive X-ray detector over a range of angles. For example, other X-ray diffraction techniques include X-ray powder diffraction in transmission geometry, Debye Scherrer analysis, Grazing Incidence X-ray Diffraction (GIXRD) analysis, Stress analysis and Texture analysis (wherein the Stress and Texture analysis involve the use of divergent X-ray beams). The apparatus can also be used to carry out X-ray Reflectometry (XRR).

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An X-ray collimator for collimating an X-ray beam in a collimation direction by limiting divergence of an incident X-ray beam, the X-ray collimator comprising a plurality of plates spaced apart from one another and arranged in a stack, along a stacking axis, to define a plurality of elongate collimator channels, wherein each elongate collimator channel is defined by a pair of adjacent plates spaced apart from one another by a separation distance;
   wherein the X-ray collimator is configured to limit divergence along the stacking axis; and
   wherein each plate of the plurality of plates has a length, wherein the length is the longest in-plane dimension of the plate, and the length of the plates varies along the stacking axis.

2. The X-ray collimator of claim 1, wherein the length of the plates decreases along the stacking axis.

3. The X-ray collimator of claim 1 wherein the separation distance between pairs of adjacent plates varies along the stack and the length of the plates varies along the stacking axis such that the acceptance angle of the X-ray collimator decreases along the stacking axis.

4. The X-ray collimator of claim 1 wherein the X-ray collimator comprises a first portion and a second portion, each of the first portion and the second portion comprising a plurality of collimator channels, wherein in the first portion the acceptance angle decreases along the stacking axis and in the second portion the acceptance angle is constant.

5. An X-ray analysis apparatus comprising:
a sample stage for supporting a sample;
an X-ray source arranged to irradiate the sample with an incident X-ray beam at an incident angle $\theta$;
a position-sensitive X-ray detector arranged to move along a scanning path, by rotating about a rotation axis, to receive X-rays from the sample at an angle $2\theta$, the position-sensitive X-ray detector comprising a plurality of detection channels for receiving X-rays; and
an X-ray collimator arranged to limit axial divergence of X-rays, wherein the acceptance angle of the X-ray collimator varies along the stacking axis and the X-ray collimator is configured to translate axially, wherein the X-ray collimator comprises a plurality of plates spaced apart from one another and arranged in a stack, along a stacking axis, to define a plurality of elongate collimator channels, wherein each elongate collimator channel is defined by a pair of adjacent plates spaced apart from one another by a separation distance;
wherein the X-ray collimator is configured to limit divergence along the stacking axis; and
wherein each plate of the plurality of plates has a length, and the length of the plates varies along the stacking axis.

6. The X-ray analysis apparatus of claim 5 wherein each of the detection channels comprises a detection strip, and the width of the stack of plates is greater than the lengths of the detection strips.

7. The X-ray analysis apparatus of claim 5 wherein the separation between adjacent plates and/or the length of the plates varies along the stacking axis such that the acceptance angle of the X-ray collimator decreases along the stacking axis.

8. The X-ray analysis apparatus of claim 5, wherein the X-ray collimator is arranged between the sample and the position-sensitive X-ray detector.

9. The X-ray analysis apparatus of claim 5 further comprising a controller configured to move the X-ray collimator.

10. The X-ray analysis apparatus of claim 5 wherein the X-ray analysis apparatus is configured to:
irradiate the sample at a fixed incident angle, $\theta$, while the angular position of the position-sensitive X-ray detector is changed; or
irradiate the sample at a variable incident angle, $\theta$, and to control the angular position of the position-sensitive X-ray detector, $2\theta$, to vary symmetrically according to the incident angle; or
irradiate the sample at a variable incident angle, $\theta$, and to control the angular position of the position-sensitive X-ray detector, $2\theta$, at an offset according to the incident angle.

11. The X-ray analysis apparatus of claim 5 wherein the X-ray analysis apparatus is configured to:
carry out X-ray diffraction analysis in parafocussing Bragg Brentano reflection geometry, carry out X-ray diffraction analysis in focusing transmission geometry, carry out X-ray diffraction analysis in Debye geometry, carry out X-ray diffraction analysis in Grazing Incidence geometry, carry out Stress analysis, carry out Texture analysis or to carry out X-ray Reflectometry measurements; or
carry out wavelength-dispersive X-ray fluorescence analysis.

12. A method of using an X-ray analysis apparatus, the method comprising:
providing the X-ray analysis apparatus comprising:
a sample stage for supporting a sample;
an X-ray source arranged to irradiate the sample with an incident X-ray beam at an incident angle $\theta$;
a position-sensitive X-ray detector arranged to move along a scanning path, by rotating about a rotation axis, to receive X-rays from the sample at an angle $2\theta$, the position-sensitive X-ray detector comprising a plurality of detection channels for receiving X-rays; and
an X-ray collimator arranged to limit axial divergence of X-rays, wherein the acceptance angle of the X-ray collimator varies along the stacking axis and the X-ray collimator is configured to translate axially, wherein the X-ray collimator comprises a plurality of plates spaced apart from one another and arranged in a stack, along a stacking axis, to define a plurality of elongate collimator channels, wherein each elongate collimator channel is defined by a pair of adjacent plates spaced apart from one another by a separation distance, wherein the X-ray collimator is configured to limit divergence along the stacking axis, and wherein each plate of the plurality of plates has a length, and the length of the plates varies along the stacking axis;
irradiating the sample with X-rays;
detecting X-rays from the sample while the X-ray collimator is at a first axial position; and
changing the axial position of the X-ray collimator from the first axial position to a second axial position to change the acceptance angle of the X-ray collimator.

13. The method of claim 12 wherein changing the axial position of the X-ray collimator increases the acceptance angle of the X-ray collimator, the method further comprising:
detecting X-rays from the sample at a measurement angle $2\theta_1$ while the detector is in its first axial position;
changing the angular position of the position-sensitive X-ray detector to an angle $2\theta_2$, wherein $2\theta_2 > 2\theta_1$.

14. A computer program product comprising instructions to cause the apparatus of claim 10 to execute the steps of the method of claim 12.

* * * * *